(12) United States Patent
Sauve

(10) Patent No.: US 6,851,498 B1
(45) Date of Patent: Feb. 8, 2005

(54) LIGHTWEIGHT COMPACT COLLAPSIBLE FOLDING PERSONAL TRANSPORTER

(76) Inventor: Dennis N. Sauve, 1060 Commerce Blvd. North, Sarasota, FL (US) 34243

(*) Notice: Subject to any disclaimer, the term of this patent is extended or adjusted under 35 U.S.C. 154(b) by 0 days.

(21) Appl. No.: 10/659,873

(22) Filed: Sep. 12, 2003

(51) Int. Cl.$^7$ .............................................. B62D 61/00
(52) U.S. Cl. ....................... 180/208; 180/65.1; 280/639
(58) Field of Search ........................... 280/639, 37, 38, 280/641, 651; 180/208, 214, 65.1

(56) References Cited

U.S. PATENT DOCUMENTS

| | | | | |
|---|---|---|---|---|
| 2,839,146 A | * | 6/1958 | Bouffort ...................... | 180/208 |
| 3,004,619 A | * | 10/1961 | Straussler .................... | 180/208 |
| 3,079,172 A | * | 2/1963 | Burwell ....................... | 280/278 |
| 3,369,629 A | * | 2/1968 | Weiss .......................... | 180/208 |
| 3,580,348 A | * | 5/1971 | Di Blasi ..................... | 180/208 |
| 3,589,745 A | * | 6/1971 | Dougherty et al. ......... | 280/639 |
| 3,770,289 A | * | 11/1973 | Dougherty et al. ......... | 280/639 |
| 5,029,666 A | * | 7/1991 | Baldoni ....................... | 180/208 |
| 5,265,695 A | * | 11/1993 | Piazzi ......................... | 180/208 |
| 6,012,539 A | * | 1/2000 | Patmont ...................... | 180/223 |
| 6,371,235 B1 | * | 4/2002 | Wisecarver ................. | 180/208 |

FOREIGN PATENT DOCUMENTS

DE   4414612   * 11/1995

* cited by examiner

Primary Examiner—Bryan Fischmann
(74) Attorney, Agent, or Firm—William Nitkin

(57) ABSTRACT

A four-wheel scooter having a collapsible shell and a seat mounted on a shaft disposed at the rear end of the scooter, such shaft movable approximately 90 degrees forward from an upright position to a storage position into a receipt slot defined in the top portion of the shell and a steering column disposed at the front end of the scooter in an upright position for use and rotatable approximately 275 degrees to a storage position against the bottom of the unit when such shell is in its collapsed storage mode.

5 Claims, 5 Drawing Sheets

US 6,851,498 B1

LIGHTWEIGHT COMPACT COLLAPSIBLE FOLDING PERSONAL TRANSPORTER

BACKGROUND OF THE INVENTION

1. Field of the Invention

The structure of this invention resides in the area of motor vehicles and more particularly relates to a lightweight collapsible folding four-wheel personal transporter or scooter which in a storage mode is easy to fold, pull and/or carry and in a use mode is easy and convenient to set up for transporting an individual as desired.

2. History of the Prior Art

Motor scooters, particularly four-wheel scooters having a seat and a steering handle, are well known such as the CITY BUG scooter manufactured for EV Rider of Sarasota, Fla. Such scooters, though, are not especially compact and lightweight so that they cannot be easily transported and/or stored when not in use.

SUMMARY OF THE INVENTION

It is an object of this invention to provide an improved four-wheel folding electric scooter which utilizes a retractable, collapsible rail frame and a rotating integral front steering assembly which rotates from an upright position to a storage position on the bottom of the collapsed scooter and a seat post and attached seat which can rotate from an upright use position to a folded position into a recess formed within the front main housing such that the scooter when folded for storage is so compact that it is similar in size to a large briefcase and can even be carried as "carry on" luggage on an airplane. The seat can also be located at a different position for use as a pull handle with the rear wheels resting on the ground so that the device can be pulled by a user walking. The front steering post with handle grip and steering mechanism is mounted so that it rotates approximately 275 degrees from an upright use position into a recess within the bottom of the main housing. The structure utilizes the improved lightweight batteries and motors of the current technology which use provides savings in size and weight over scooters having conventional drive systems and traditional motor transmissions. The location of the motor(s) in the scooter of this invention is near the rear wheels, and the battery is located within the main housing of the structure. The battery can incorporate modern nickel metal hydride or lithium ion technology. The unit can weigh approximately 28 lb. and carry an individual weighing upwards of 300 lb. In a folded storage mode the unit is approximately 22 inches long, 6¼ inches high and 19 inches wide; and in an unfolded use mode the unit is approximately 36 inches long and 30 inches high when the seat and steering handle are erected, and 19 inches wide. The collapsible main housing and overlapping shells allow for the lateral adjustment of the wheel base to extend from an extended state of 30 inches to a collapsed state of 16 inches. The integrated folding seat can include a pull handle, as described further below.

DESCRIPTION OF THE PREFERRED EMBODIMENT(S)

Figure 1:
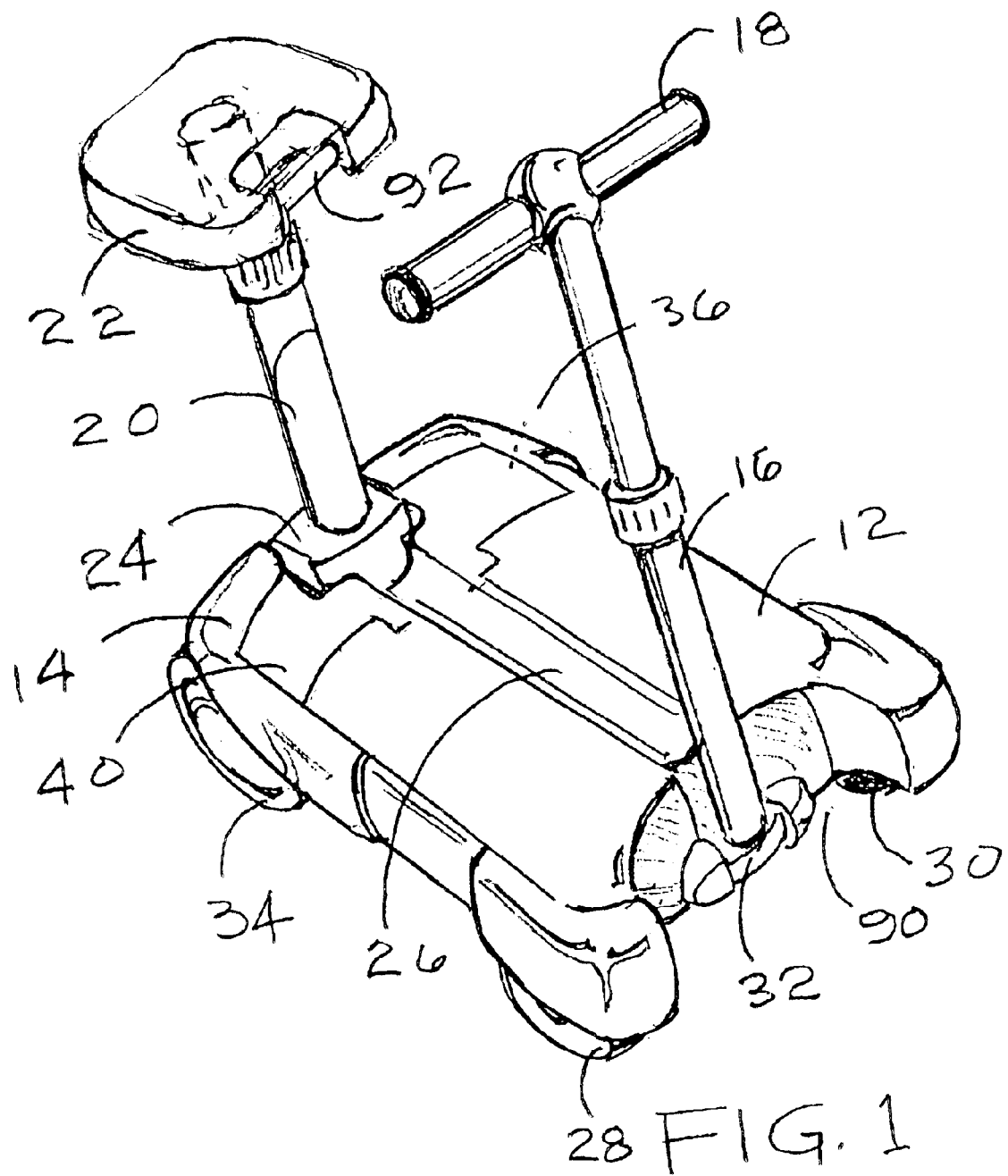
FIG. 1 illustrates a perspective view of the scooter of this invention in its use mode with the seat and steering post erected.
Figure 2:
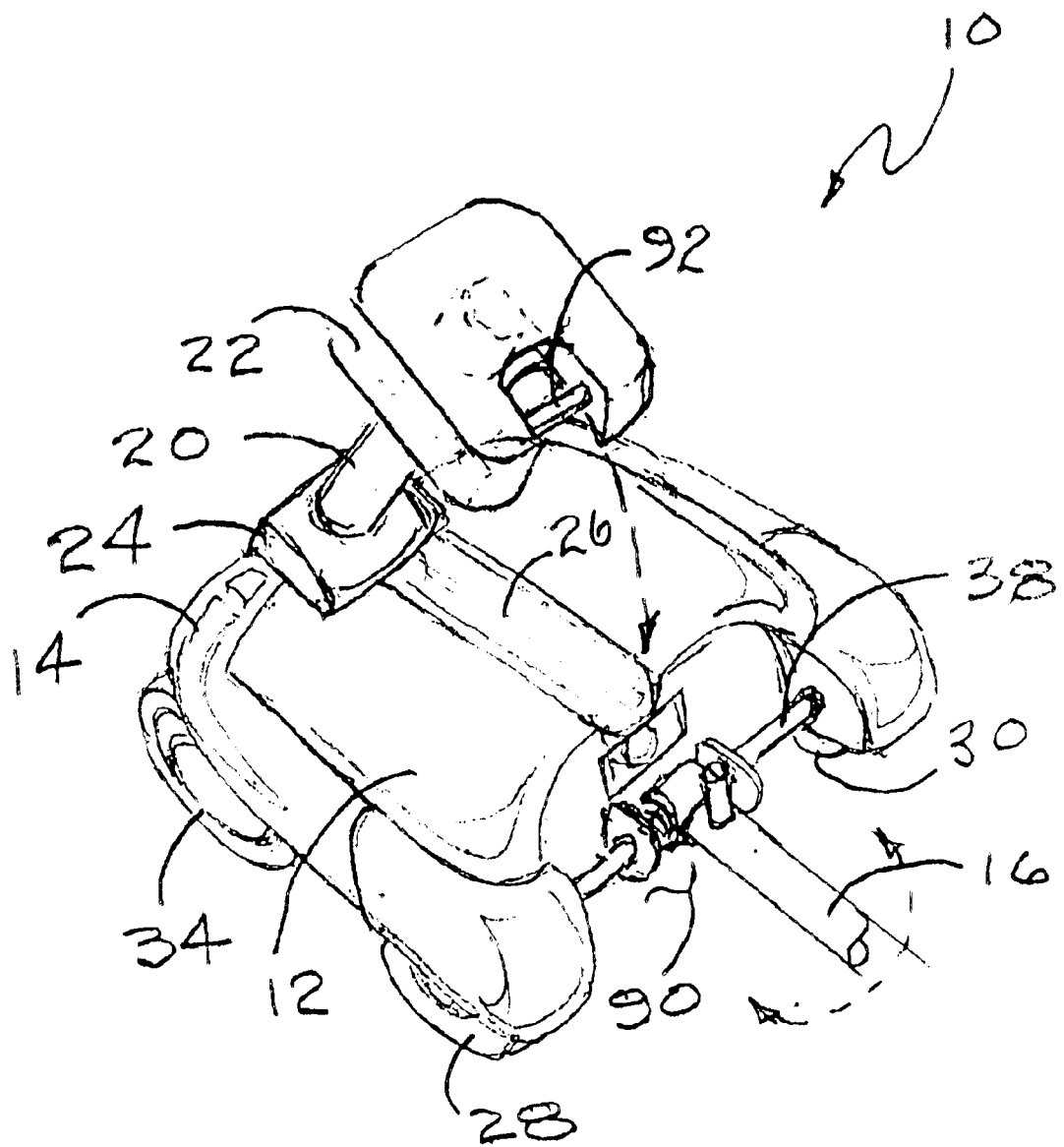
FIG. 2 illustrates a perspective view of the unit of FIG. 1 in the process of being collapsed into its storage mode, showing the steering post being rotated downward approximately 90 degrees from its upright position on its way to being rotated further to be adjacent to the bottom of the main housing with the seat in the process of being collapsed for the seat post to be positioned into the seat post receipt slot.

FIG. 1 illustrates a perspective view of the scooter of this invention. Scooter 10 has four wheels, being first front wheel 28, second front wheel 30, first rear wheel 34 and second rear wheel 36 which are held onto a framework as described in more detail below. In FIG. 1 one can see front shell 12 of the main housing which can be moved over smaller sections of rear shell 14 when the front and rear shells are collapsed together such that front shell 12 moves over the smaller front shell receipt area 40 defined in a portion of rear shell 14, allowing the scooter to be collapsed. When in its collapsed state, as seen in FIG. 2, front shell 12 substantially overlaps portions of rear shell 14. As seen in FIG. 1, steering column 16 is shown in its upright position such that by rotating steering handle 18, the steering movement of first and second front wheels 28 and 30 can be achieved. To operate the scooter, one sits on seat 22 mounted on seat shaft 20 and can activate controls for acceleration and braking, which controls can be positioned in any desired location on the structure, such as on steering handle 18. In use one sits on seat 22 and rotates steering handle 18 to steer the scooter while it is moving. When one is finished using the scooter and wishes to place it into its storage mode, one first pushes the front of the device to the rear such that front shell 12 covers over front shell receipt area 40 of rear shell 14, thus substantially reducing the size of the unit by moving first and second front wheels 28 and 30 much closer to first and second rear wheels 34 and 36. One then can rotate steering column 16 downward and around to its position on the bottom of the scooter, as described further below, and as seen partially moved into such position in FIG. 2, being rotated on front wheel shaft 38 with seat 22 being moved on seat shaft hinge 24 such that seat shaft 20 can pass into seat shaft receipt slot 26 formed in the tops of front shell 12 and rear shell 14 for storage. When seat 22 is in seat receipt area 90, one can grasp handle 92 to pull the scooter on its first and second rear wheels 34 and 36.

Figure 3:
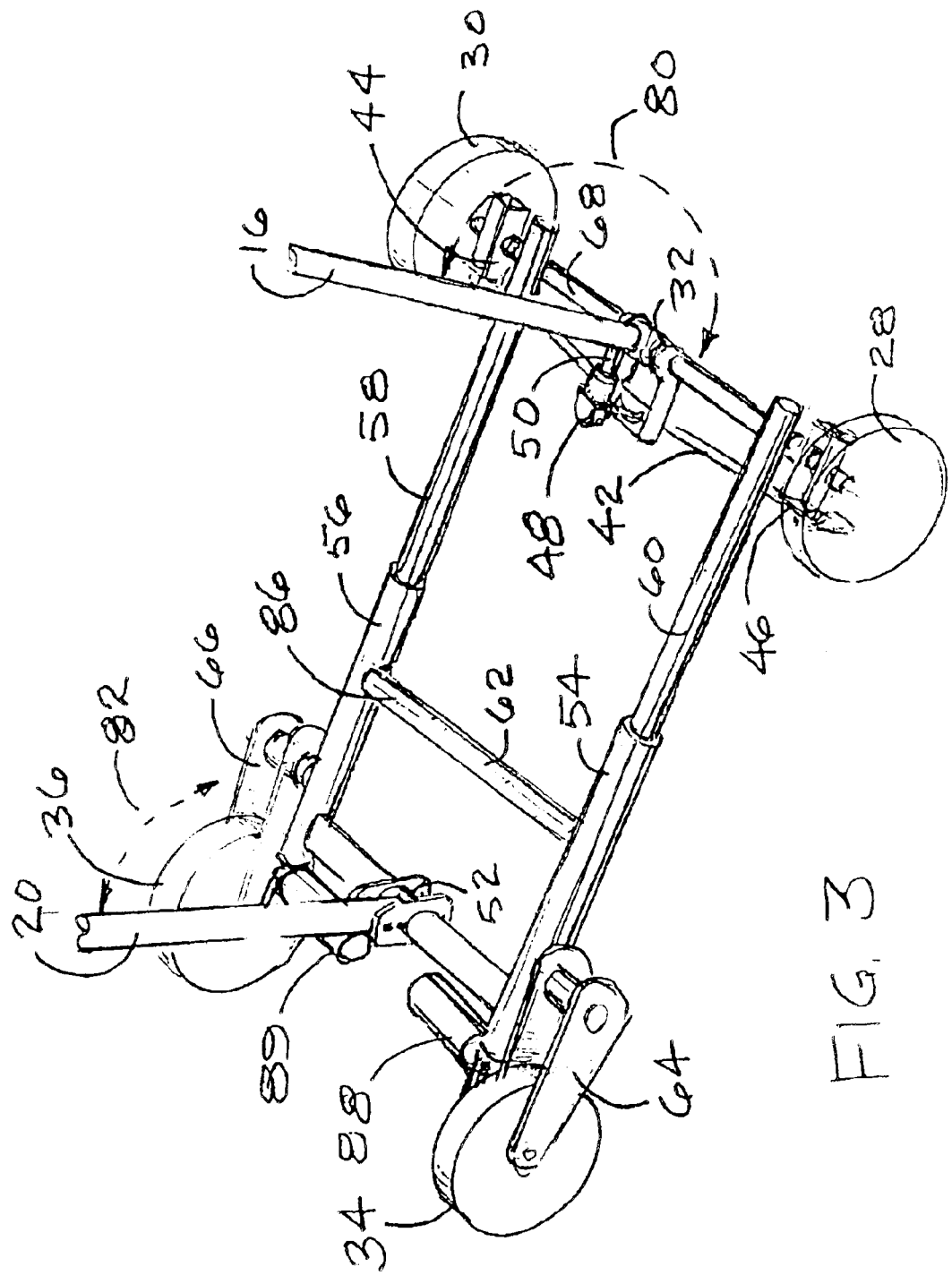
FIG. 3 illustrates a perspective view of the interior frame of the device of this invention with the main housing removed, showing the interior frame in its extended use position.
Figure 4:
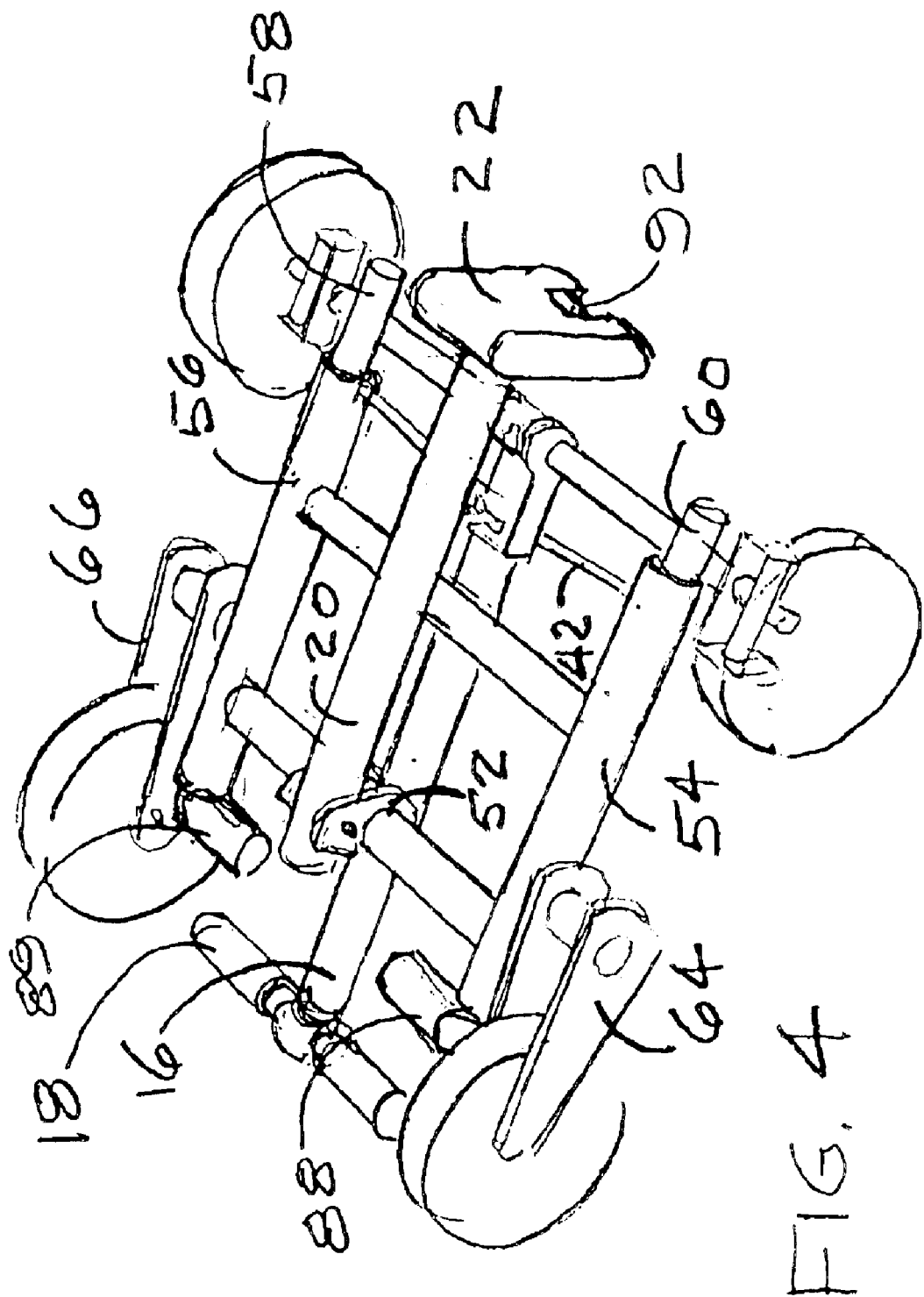
FIG. 4 illustrates a perspective view of the interior frame of the device of this invention with the main housing removed showing the interior frame in a collapsed storage position with the steering handle rotated to its storage position beneath the unit and with the seat also moved down into its storage position.

FIG. 3 illustrates the framework of the interior of the scooter with the front and rear shells removed, showing first frame rail 54 and second frame rail 56 which can telescopically receive, respectively, therein a first frame rail extension 60 and second frame rail extension 58 in a fashion such that first and second frame rail extensions 60 and 58 can be maneuvered inward and outward to collapse or extend the frame rail extensions within the frame rails. Seen in this view is seat shaft 20 which is supported on a seat shaft hinge 52 which allows the seat and seat shaft to be folded forward into its storage mode when desired. First and second rear wheels 34 and 36 are mounted, respectively, on first rear wheel suspension member 64 and second rear wheel suspension member 66. A motor can be placed near one or both rear wheels such as motor 88 seen near first rear wheel 34 and motor 89 seen near second rear wheel 36. The motors can drive the wheels by drive belts. Also shown in FIG. 3 is angle 82 of movement of seat shaft 20 as well as crossbar 62 for additional strength which can support thereon or nearby a battery disposed in battery storage area 86. Battery technology is well known and is not illustrated but is understood to be placed within the body of the structure of this invention and to be interconnected by wires, not shown but also well known, to drive motor 88 near first rear wheel 34. Also seen in FIG. 3 is steering column 16 which is rotatably mounted on steering shaft 68, on the first and second ends of which are rotatably mounted first front wheel 28 and second front wheel 30. Tie rod 42 connects first spindle 46 to second spindle 44 to effect the steering movement of the front wheels, as described further below. Steering column 16 can be rotated on steering shaft hinge 32 completely around steering shaft arc 80, such as seen in FIGS. 2 and 3, so that it comes to rest on the bottom of the collapsed structure, as best seen in FIG. 4. Lastly, when placing the scooter of this invention into its storage mode, seat shaft 20 and seat 22 are rotated downward to a collapsed position where seat shaft 20 fits within seat shaft receipt slot 26 and seat 22 fits within seat receipt area 90 defined in the front of the main housing, as seen in FIG. 1.

Figure 5:
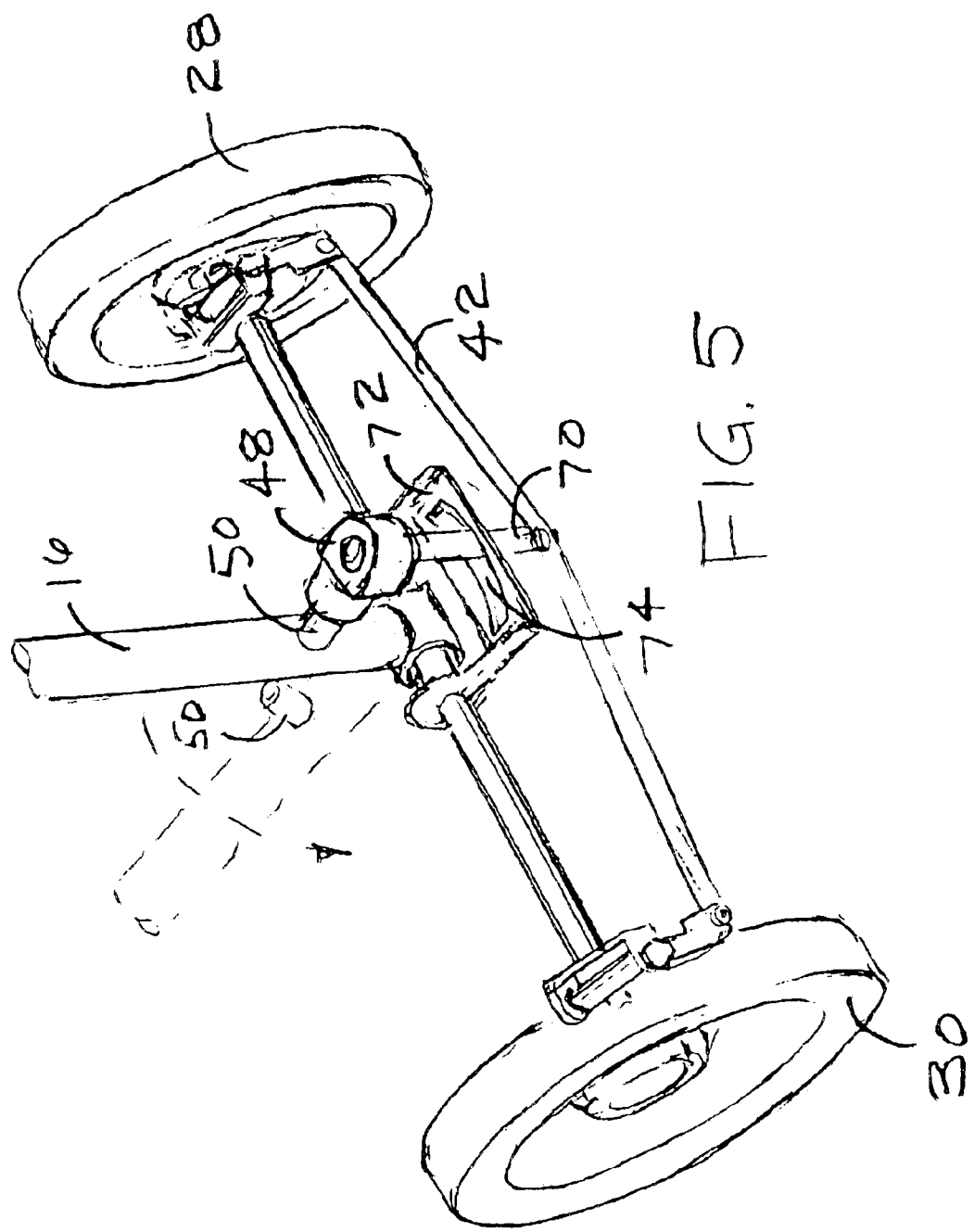
FIG. 5 illustrates a rear perspective view of the front of the steering assembly of this invention so that its detailed components can be better seen.

FIG. 5 illustrates a rear perspective view of the front of the steering assembly wherein tie rod 42 connects the spindles on the wheels to cause their steering movement. Tie rod 42 is connected through a link shaft 70 to a link member 48 above the shaft, the movement of link shaft 70 being controlled within link plate slot 74 formed within steering column receptor plate 72 such that as steering column 16 is rotated, link engagement member 50 is held within link member 48 and when rotated by steering column 16, can move link shaft 70 back and forth within link plate slot 74 such that it can steer first and second front wheels 28 and 30 from side to side when steering column 16 is in its upright position. When it is desired to fold steering column 16 downward to a storage position, it is rotated on steering shaft hinge 32, as seen in FIGS. 1 and 3, which rotation pulls link engagement member 50 out of its mating receipt slot within link member 48, thereby allowing steering column 16 to be rotated downward to its storage position under the unit, as seen in FIG. 4.

Although the present invention has been described with reference to particular embodiments, it will be apparent to those skilled in the art that variations and modifications can be substituted therefor without departing from the principles and spirit of the invention.

I claim:

1. A scooter having a front end, a rear end, two wheels disposed at said front end, two wheels disposed at said rear end, and a steering mechanism, said steering mechanism disposed at said front end, comprising:

a collapsible frame, said frame being extended in its use mode and collapsed in its storage mode;

a shell disposed over said frame, said shell comprised of a front shell and a rear shell, said front and rear shells each having a top portion and one having a section adapted to fit within the other such that said shell can be collapsed along with said collapsible frame;

a steering column disposed at said front end of said scooter mounted in an upright position in a first use position for steering said scooter and in a second storage mode rotatable approximately 275 degrees to a storage position beneath said shell;

a seat shaft having a top, said seat shaft mounted at said rear end of said scooter;

a seat mounted on said top of said seat shaft, said seat shaft hinged to move approximately 90 degrees forward from an upright use position to a horizontal storage position when said shell is in its collapsed storage mode;

a seat shaft receipt slot defined in said top portions of said front shell and said rear shell for receiving said seat shaft when said scooter is in its storage mode;

at least one motor disposed inside said shell for driving at least one wheel of said scooter; and a battery positioned inside said shell for providing power to said motor.

2. The scooter of claim 1 wherein said steering column in its upright position engages into and controls said steering mechanism of said scooter; and said steering column, when moved from its upright use position to its storage position, disengages from said steering mechanism.

3. The scooter of claim 2 wherein said collapsible frame is comprised of telescoping tubular members.

4. The scooter of claim 1 wherein said shell further includes a seat receipt area defined therein for receipt of said seat when said shell is in its storage position.

5. The scooter of claim 4 wherein said seat further includes a handle therein for grasping and pulling said scooter on said rear wheels when said scooter is in its storage mode.

* * * * *